(12) United States Patent
Gainer et al.

(10) Patent No.: US 11,017,476 B1
(45) Date of Patent: May 25, 2021

(54) TELEMATICS SYSTEM AND METHOD FOR ACCIDENT DETECTION AND NOTIFICATION

(71) Applicant: UIPCO, LLC, San Antonio, TX (US)

(72) Inventors: Jerome Gainer, Helotes, TX (US); Elliott Kehoe, San Antonio, TX (US); Bharat Prasad, San Antonio, TX (US); Leslie Daverso, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 552 days.

(21) Appl. No.: 15/353,461

(22) Filed: Nov. 16, 2016

Related U.S. Application Data

(60) Provisional application No. 62/256,546, filed on Nov. 17, 2015.

(51) Int. Cl.
*G06Q 40/08* (2012.01)
*G06Q 10/10* (2012.01)
*G07C 5/00* (2006.01)
*G07C 5/08* (2006.01)

(52) U.S. Cl.
CPC .......... *G06Q 40/08* (2013.01); *G06Q 10/10* (2013.01); *G07C 5/008* (2013.01); *G07C 5/0841* (2013.01)

(58) Field of Classification Search
CPC ........ G06Q 40/08; G06Q 10/10; G07C 5/008; G07C 5/085; H04W 4/02; H04W 4/046; H04W 76/50
USPC ............ 705/4; 280/730.2, 733, 735; 701/45, 701/32.2, 31.4, 408; 340/436; 180/271
See application file for complete search history.

(56) References Cited

U.S. PATENT DOCUMENTS

| | | | | |
|---|---|---|---|---|
| 3,646,583 A | * | 2/1972 | Scuderi ................. | B60Q 1/445 340/436 |
| 4,371,751 A | * | 2/1983 | Hilligoss, Jr. ........ | H04M 11/045 379/38 |
| 5,109,399 A | * | 4/1992 | Thompson ............. | H04M 11/04 340/286.14 |
| 5,388,147 A | * | 2/1995 | Grimes ................ | G08B 25/016 455/404.2 |
| 5,515,043 A | * | 5/1996 | Berard .................. | B60R 25/102 340/426.19 |
| 5,515,285 A | * | 5/1996 | Garrett, Sr. ........... | B60R 25/102 340/426.2 |

(Continued)

OTHER PUBLICATIONS

Palmer, Scott "Telematics in Auto Claims is Inevitable" Aug. 18, 2016, https://www.cccis.com/2016/08/18/telematics-auto-claims-inevitable/.*

(Continued)

*Primary Examiner* — Kelly S. Campen
(74) *Attorney, Agent, or Firm* — Locke Lord LLP; Christopher J. Capelli

(57) ABSTRACT

A computer-implemented method and system for performing analytics on telematics data to determine incidence of a relevant vehicle event and provide event notification. Telematics data is acquired from a data capture device associated with a vehicle and at least a portion of the telematics data is transmitted to a computer device configured to perform analytics on the captured telematics data. Analytics is performed on the computer device to determine if a relevant event has occurred regarding the vehicle. Event notification is generated and transmitted to a user computing device when it is determined a relevant event has occurred.

15 Claims, 6 Drawing Sheets

(56) References Cited

U.S. PATENT DOCUMENTS

| | | | | |
|---|---|---|---|---|
| 5,686,910 | A * | 11/1997 | Timm | G08G 1/127 340/426.19 |
| 6,073,004 | A * | 6/2000 | Balachandran | G08B 25/001 455/404.2 |
| 6,574,484 | B1 * | 6/2003 | Carley | G08B 25/016 455/521 |
| 6,957,142 | B2 * | 10/2005 | Entenmann | G01C 21/3626 701/117 |
| 7,119,669 | B2 * | 10/2006 | Lundsgaard | G08G 1/205 340/436 |
| 7,228,211 | B1 * | 6/2007 | Lowrey | G07C 5/008 701/31.5 |
| 7,676,306 | B2 * | 3/2010 | Kubo | G07C 5/0858 701/32.3 |
| 7,999,741 | B2 * | 8/2011 | Graves | A61B 5/02055 342/457 |
| 8,024,083 | B2 * | 9/2011 | Chenn | G07C 5/008 701/31.5 |
| 8,054,168 | B2 * | 11/2011 | McCormick | G07C 5/0866 340/436 |
| 8,401,878 | B2 * | 3/2013 | Stender | G06Q 10/10 705/4 |
| 8,508,353 | B2 * | 8/2013 | Cook | G07C 5/0808 340/439 |
| 8,595,034 | B2 * | 11/2013 | Bauer | G06Q 40/02 434/322 |
| 8,825,369 | B2 * | 9/2014 | Jin | G01C 21/26 701/300 |
| 8,892,451 | B2 * | 11/2014 | Everett | G06Q 40/08 705/4 |
| 8,930,231 | B2 * | 1/2015 | Bowne | G07C 5/0858 705/4 |
| 9,333,913 | B1 * | 5/2016 | Elders | B60Q 9/008 |
| 9,511,778 | B1 * | 12/2016 | Fuentes | G07C 5/008 |
| 9,721,400 | B1 * | 8/2017 | Oakes, III | G06Q 40/08 |
| 9,830,665 | B1 * | 11/2017 | Healy | G06Q 40/08 |
| 10,223,912 | B1 * | 3/2019 | Agarwal | G08G 1/16 |
| 10,410,439 | B1 * | 9/2019 | Gingrich | G01N 29/12 |
| 10,460,394 | B2 * | 10/2019 | Perl | G06Q 50/30 |
| 2002/0111725 | A1 * | 8/2002 | Burge | G06Q 40/08 701/31.4 |
| 2003/0009270 | A1 * | 1/2003 | Breed | B60N 2/2863 701/32.4 |
| 2003/0065432 | A1 * | 4/2003 | Shuman | G08G 1/096844 701/48 |
| 2004/0145459 | A1 * | 7/2004 | Himmelstein | G06Q 10/10 340/426.19 |
| 2009/0002145 | A1 * | 1/2009 | Berry | G08G 1/205 340/436 |
| 2010/0174564 | A1 * | 7/2010 | Stender | G06Q 40/08 705/4 |
| 2010/0219944 | A1 * | 9/2010 | McCormick | G07C 5/008 340/436 |
| 2012/0004933 | A1 * | 1/2012 | Foladare | G06Q 40/00 705/4 |
| 2012/0076437 | A1 * | 3/2012 | King | G06Q 10/10 382/286 |
| 2013/0030642 | A1 * | 1/2013 | Bradley | G07C 5/008 701/32.2 |
| 2015/0213555 | A1 * | 7/2015 | Barfield, Jr. | G06Q 40/08 705/4 |
| 2015/0348058 | A1 * | 12/2015 | Liu | G06Q 30/0201 705/14.49 |
| 2017/0372431 | A1 * | 12/2017 | Perl | G06Q 20/10 |
| 2018/0025430 | A1 * | 1/2018 | Perl | B60R 16/0231 705/4 |
| 2018/0047107 | A1 * | 2/2018 | Perl | G06N 5/02 |
| 2018/0300816 | A1 * | 10/2018 | Perl | G06Q 50/01 |

OTHER PUBLICATIONS

Byrne, Peter "Introducing Instant Crash Notification" Jun. 6, 2016, https://www.calamp.com/blog/2016/06/introducing-instant-crash-notification/.*

Qian et al. "Vehicle Safety Enhancement System: Sensing and Communication." Dec. 2013 Personality and Social Psychology Bulletin, pp. 580-591.*

Aston, Adam "A Flight Data Recorder for Your Car" Nov. 6, 2003, Business Week.*

Juliussen, Egil "The Future of Automotive Telematics" 2005, Business Briefing; Global Automotive Manufactoring and Technology.*

\* cited by examiner

TELEMATICS SYSTEM AND METHOD FOR ACCIDENT DETECTION AND NOTIFICATION

CROSS REFERENCE TO RELATED APPLICATIONS

This application claims priority to U.S. Patent Application Ser. No. 62/256,546 filed Nov. 17, 2015 which is incorporated herein by reference in its entirety.

FIELD OF THE INVENTION

The disclosed embodiments generally relates to the field of computers and similar technologies, and more particularly, to a system, method, and computer-usable medium relating to detecting and providing notification regarding vehicle events utilizing telematics data.

BACKGROUND OF THE INVENTION

The use of telematics in automobiles has become more common in recent years, particularly as implemented with vehicle systems. Latest developments in vehicle electronics are dealing with the automatic monitoring of the state of a vehicle such as a car, bus, train, airplane, or any similar vehicle. Such monitoring is based on the integration of numerous sensors into the vehicle such that important functional parts and components may be monitored. It is becoming of increasing interest to collect a variety of information, regarding different aspects of a vehicle, which may have different applications depending on their usage.

Recently, to make vehicular insurance evaluations and analyses, insurance companies have suggested taking into account vehicle telematics data. However, not all vehicles have the sensors necessary to measure or record useful telematics data and user data (e.g., relating to the vehicle operator). In other cases, communicating with the vehicle's sensors or the vehicle computer that monitors those sensors poses a challenge. For example, different types of vehicles have different vehicle computers, each of which requires a different vehicle communication protocol for communication. In these situations, it may be desirable to provide a supplemental telematics sensing system for a vehicle. However, these supplemental telematics sensing systems tend to be bulky, expensive, cumbersome, and difficult to use. Thus, alternative telematics analytic systems may be desirable.

Smartphones and tablet devices such as those running the iOS or android operating systems are becoming more and more common. These smartphones have processing and memory capabilities that are comparable to those of desktop computers, and are miniature computers in their own right. In addition, the incorporation of telematics sensors such as accelerometers and GPS sensors into smartphones is becoming more prevalent. For example, the IPHONE® device includes a miniature accelerometer that is configured to provide acceleration data to any of a multitude of applications executing on the IPHONE® device processor. The powerful processing and memory capabilities of modern smartphones, along with their data transmission capabilities, telematics-sensing capabilities, and widespread adoption, make them suitable candidates for portable supplemental telematics sensing systems for vehicles.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer-implemented method and system for performing analytics on telematics data to determine incidence of a vehicle event and provide event notification is described in which telematics data is acquired from a data capture device associated with a vehicle, or acquired directly from a vehicle, and at least a portion of the telematics data is transmitted to a computer device configured to perform analytics on the captured telematics data. Analytics is performed on the computer device to determine if, for example, an accident event has occurred regarding the vehicle. Accident event notification is generated and transmitted to a user computing device and to other systems when it is determined an accident event has occurred.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
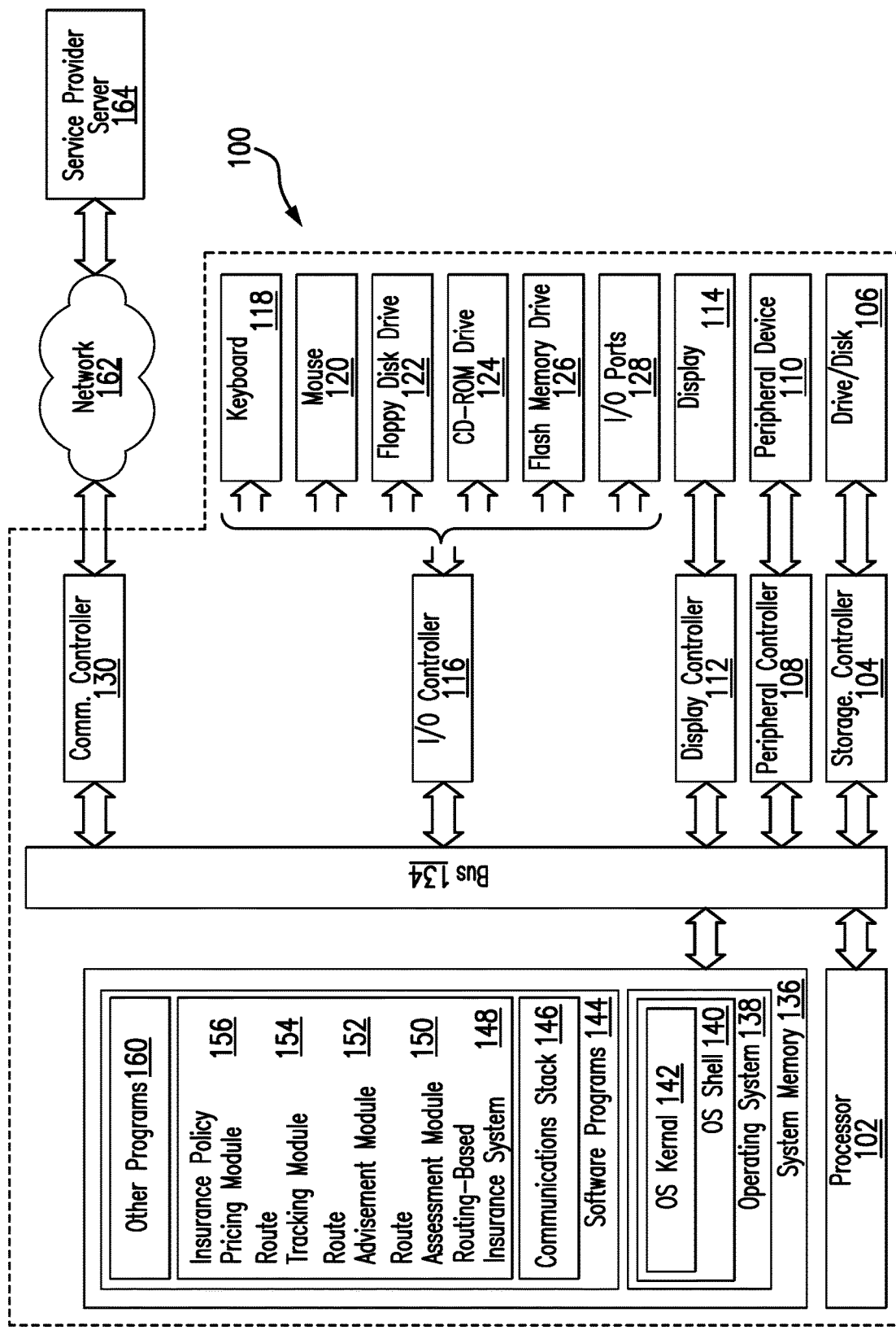
FIG. 1 depicts an exemplary client information processing system (IPS) in which embodiments of the disclosure may be implemented.

Described herein in accordance with the illustrated embodiments is a system, method, and computer-usable medium using telematics data. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

This application relates to the following: U.S. patent application Ser. No. 14/925,422 filed Oct. 28, 2015; and U.S. patent application Ser. No. 15/287,838 filed Oct. 7, 2016 which are herein incorporated herein by reference in their entirety.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to one or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146 and other programs 160. The communications stack 146 is operable to implement any communication protocol enabling various embodiments of the disclosure. Software programs 144 also include a routing-based telematics system 200, which comprises a route assessment module 150, a route advisement module 152, a route tracking module 154, and an insurance policy pricing module 156. The routing-based telematics system 200 includes computer executable instructions for implementing the processes described in FIGS. 2-6 described herein below. In one embodiment, client IPS 100 is able to download the computer executable instructions of the routing-based telematics system 200 from a service provider server 164 located at a remote location. In another embodiment, the computer executable instructions of the routing-based telematics system 200 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

In accordance with certain embodiments described herein, it is to be understood and appreciated that telematics generally refers to solutions that are based on information flowing to and/or from a vehicle. For example, vehicle telematics can refer to automobile systems that combine Global Positioning System (GPS) tracking and other wireless communications for automatic roadside assistance and remote diagnostics. When implemented, telematics have the potential to increase operational efficiency and improve driver safety in a number of ways. For example, GPS technology can be used to track a vehicle's location, mileage, and speed. Communications technology promotes connectivity between drivers and other parties such as service dispatchers (e.g., public safety answering point or PSAP, traffic data aggregator, commercial telematics service providers or call centers such as Onstar Corporation, and the like). Sensors monitor vehicle operations and conditions which can then be used to streamline vehicle maintenance, or facilitate seeking assistance for the vehicle occupants. For example, accelerometers measure changes in speed and direction, and cameras can monitor road conditions, and drivers' actions. Additional sensor devices may monitor and/or determine vehicle fuel efficiency, remaining battery charge (e.g., utilized to power a vehicle's transmission) and/or battery charge consumed for a one or more vehicle trips.

It is to be further understood and appreciated that in embodiments illustrated herein, at least one accelerometer is preferably provided, which may be provided as a vehicle component or in a portable device 204 (which may include a smart phone or tablet device, such as the IPHONE® and IPAD®). In embodiments described below, illustrated is a user device 204 used in conjunction with a vehicle telematics device.

It is also to be appreciated that device 204 may also encompass a vehicle-to-vehicle (V2V) and vehicle-to-infrastructure (V2I) data capture device. For instance, a networked roadway camera may capture license plate information and determine time/location for the vehicle. The accelerometer, preferably an XYZ or 3-axis accelerometer, can be used for crash and other significant event detection. Three axis is preferred because the orientation of the accelerometer will change from car to car depending on mounting method. In certain embodiments, the accelerometer can be a 3-axis (XYZ) accelerometer capable of measuring G forces up to a range of, for example, 15 G or higher, or in other exemplary embodiments, up to 25 G or higher, to insure that the accelerometer reading does not clip during a crash. This is required in order to obtain an accurate delta velocity ($\Delta V$) reading. In addition, when the accelerometer is mounted securely in the vehicle, the accelerometer can more accurately capture G forces transmitted through the body of the vehicle. Another option, for example, is to use a 2-axis (XY) accelerometer capable of measuring G forces in the range of 15 G or higher, or in the range of 25 G or higher, which is aligned or calibrated based on the installation orientation to measure lateral forces on the vehicle. The calibration is an extra step but it allows the use of a 2-axis accelerometer.

Figure 2:
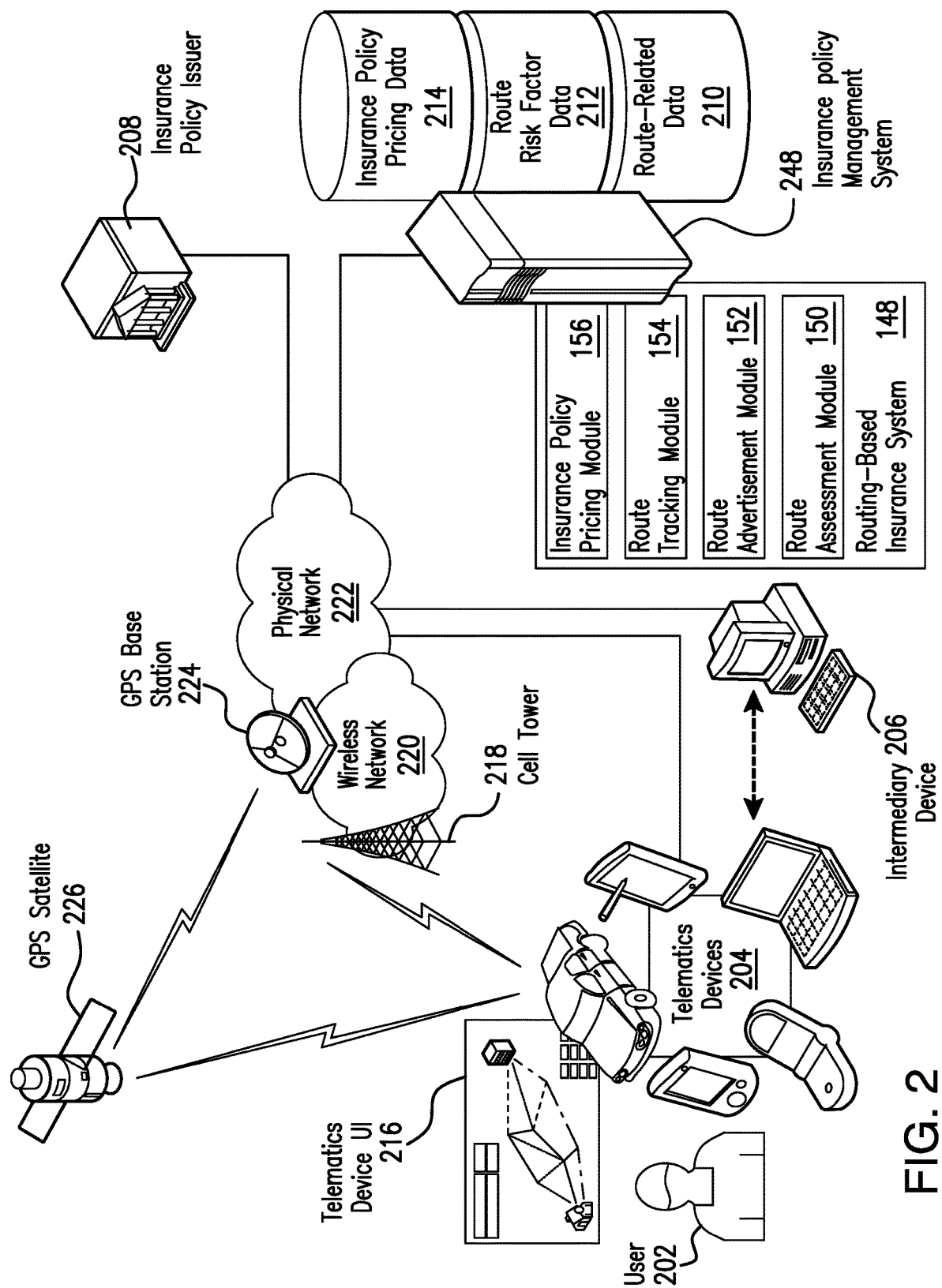
FIG. 2 is a simplified block diagram of a routing-based insurance system as implemented in accordance with an embodiment of the disclosure.

FIG. 2 is a simplified block diagram of a routing-based telematics system 200 as implemented in accordance with an embodiment of the disclosure. In various embodiments, a routing-based telematics system 200 is implemented with an insurance policy management system 248 for the provision of routing-based insurance to a user 202. It is to be appreciated that in the context of the present illustrated embodiment, a user 202 may also encompass semi-autonomous and autonomous vehicles.

In these and other embodiments, the routing-based telematics system 200 includes a computer server 205 configured with software to execute at least the functionality described herein. In one illustrated embodiments, the computer server 205 is operatively coupled to a repository of route-related data 210, a repository of route risk factor data 212, and a repository of insurance policy pricing data 214. In the one or more illustrated embodiments, the computer server 205 further preferably includes a route assessment module 150, a route advisement module 152, a route tracking module 154, and an insurance policy pricing module 156.

In various embodiments, a telematics device 204 exchanges information in near real-time, or non-real-time, directly or indirectly, through one or more networks 220, 222 and intermediary devices 206, with the routing-based telematics system 200. As used herein, telematics broadly refers to the integrated use of telecommunications and informatics. More specifically, and as mentioned above, telematics refers to the receiving, storing, processing and sending of information via telecommunication devices, such as the telematics devices 204. As likewise used herein, a device used in a telematics system may comprise an On Board Device (OBD) which preferably connects to a vehicles Engine Control Unit (ECU), be a direct integration within the vehicle, a smart phone device, a laptop computer, a tablet computer, a personal digital assistant (PDA), V2V devices, V2I device, wearable computing devices, a mobile telephone, or any device operable to receive, process, store, and transmit information. Likewise, a telematics system device may also comprise a navigation device or a geographic positioning system (GPS), such as embodied in a GPS satellite 226 and a GPS base station 224 attached to a physical network 222 or wireless network 220.

Skilled practitioners of the art will be aware that the use of telematics has more recently been related to the integration of GPS technology with computers and mobile communications technology in automotive navigation systems. When used in such systems, telematics is more commonly referred to as vehicle telematics. One application of vehicle telematics is to monitor the location and movement of a vehicle. This monitoring is commonly achieved through a combination of a GPS receiver and a transmitting device, such as a Global System for Mobile communication (GSM) General Packet Radio Service (GPRS) modem or a Short Message Service (SMS) transmitter. In these and other embodiments, a vehicle may comprise any method of transportation, including but not limited to, an automobile, a motorcycle, a bicycle, an aircraft, or an aquatic vessel. In one embodiment, the telematics device 204 is not implemented with a vehicle. Instead, the telematics device is implemented for use by a user 202 traversing a route on foot. In this embodiment, the movement of the user 202 along a route is monitored by the telematics device 204.

In various embodiments, data related to the user's 202 traversal of a route is provided by the telematics device 204 to the routing-based telematics system 200. In one embodiment, the data is provided by the telematics device 204 directly to the routing-base telematics system 200 through a wireless connection to a cell tower 218 of the wireless network 220, which is likewise connected to physical network 222. In another embodiment, the data is provided by the telematics device 204 directly to the routing-based telematics system 200 through a connection to the physical network 222. In yet another embodiment, the data is indirectly provided by the telematics device 204 to the routing-based telematics system 200 through an intermediary device 206, which in turn is connected to the physical network 222. It will be apparent to skilled practitioners of the art that many such embodiments are possible for the receipt, storage, processing, and transmittal of routing-based insurance information by the telematics devices 204, and the foregoing are not intended to limit the spirit, scope or intent of the disclosure.

In various embodiments, the telematics device 204 determines the current location of an insured (e.g., user 202) of a routing-based insurance policy issued by an insurance policy issuer 208. In one embodiment, the current location is determined by using GPS technology, such as that provided by the GPS base station 224 and GPS satellite 226, implemented in a vehicle navigation system. In another embodiment, the current location is automatically determined by the telematics device 204. In yet another embodiment, the current location is provided to the telematics device 204 by the user 202. Once determined, the current location of the user 202 is submitted to the routing-based telematics system 200, directly or indirectly, by the telematics device 204.

In one embodiment, the user 202 knows their destination in advance and uses a telematics device 204 to submit the destination location, directly or indirectly, to the routing-based telematics system 200. The routing-based telematics system 200 then processes information related to the current location and the destination location to determine available route segments between the two locations. In one embodiment, the information related to the current location and the destination location is stored in a repository of route-related data 210. In another embodiment, the user 202 may not have a specific destination in mind. If that is the case, then available route segments originating from the current location are determined.

Once the route segments have been determined, a set of risk score data is generated for each of the available route segments. It is to be appreciated the risk score data may be used to determine a user's "Driving Score", which driving score may be cumulative for a prescribed time period or can be determined a trip-by-trip basis.

In various embodiments, the set of risk score data is generated from a plurality of risk factor data associated with each route segment. As used herein, risk factor data refers to data that can be used to characterize one or more risk factors for a route segment. In one embodiment, the risk factor data related to a route segment is stored in the repository of route risk factor data 212. In one embodiment, the set of risk factor score data is generated by the route assessment module 150.

A set of risk score differential data is generated for each of the route segments. In one embodiment, the risk score differential data is generated by the route assessment module 150 performing comparison operations between a first set of risk score data and a second set of risk score data as described in greater detail herein. Information related to each route segment is then retrieved for use as routing instructions. For example, the routing instructions may include information associated with a map. In one embodiment, the information related to each route segment is stored in the repository of route-related data 210. Route advisement data, comprising the routing instructions and the set of risk score differential data for the route segment, is generated. In one embodiment, the route advisement data is generated by the route advisement module 152 of the routing-based telematics system 200. The route advisement data is then provided to the telematics device 204, where it is displayed within the user interface (UI) 216 of the telematics device. Once displayed, a route segment is selected by the user 202 for traversal, followed by the submission of the selected route segment by the telematics device 204 to the routing-based telematics system 200.

The selected route segment is then traversed by the user 202 and route traversal data is generated. In one embodiment, the route traversal data is generated by the route tracking module 154 from data related to the user's 202 traversal of the selected route segment. The set of risk score differential data associated with the traversed route segment is determined and then associated with the insured's insurance policy. Insurance policy price data, corresponding to the traversed route segment, is then generated by processing the route segment's associated set of risk score differential data. In turn, the route traversal data and the insurance policy price data associated with the traversed route segment is processed to generate insurance policy adjustment data. In one embodiment, the insurance policy price data and the insurance policy adjustment data is generated by the insurance policy pricing module 156. The insurance policy price adjustment data is processed by an insurance policy pricing module 156 to modify pricing data associated with the insured's insurance policy.

Figure 3:
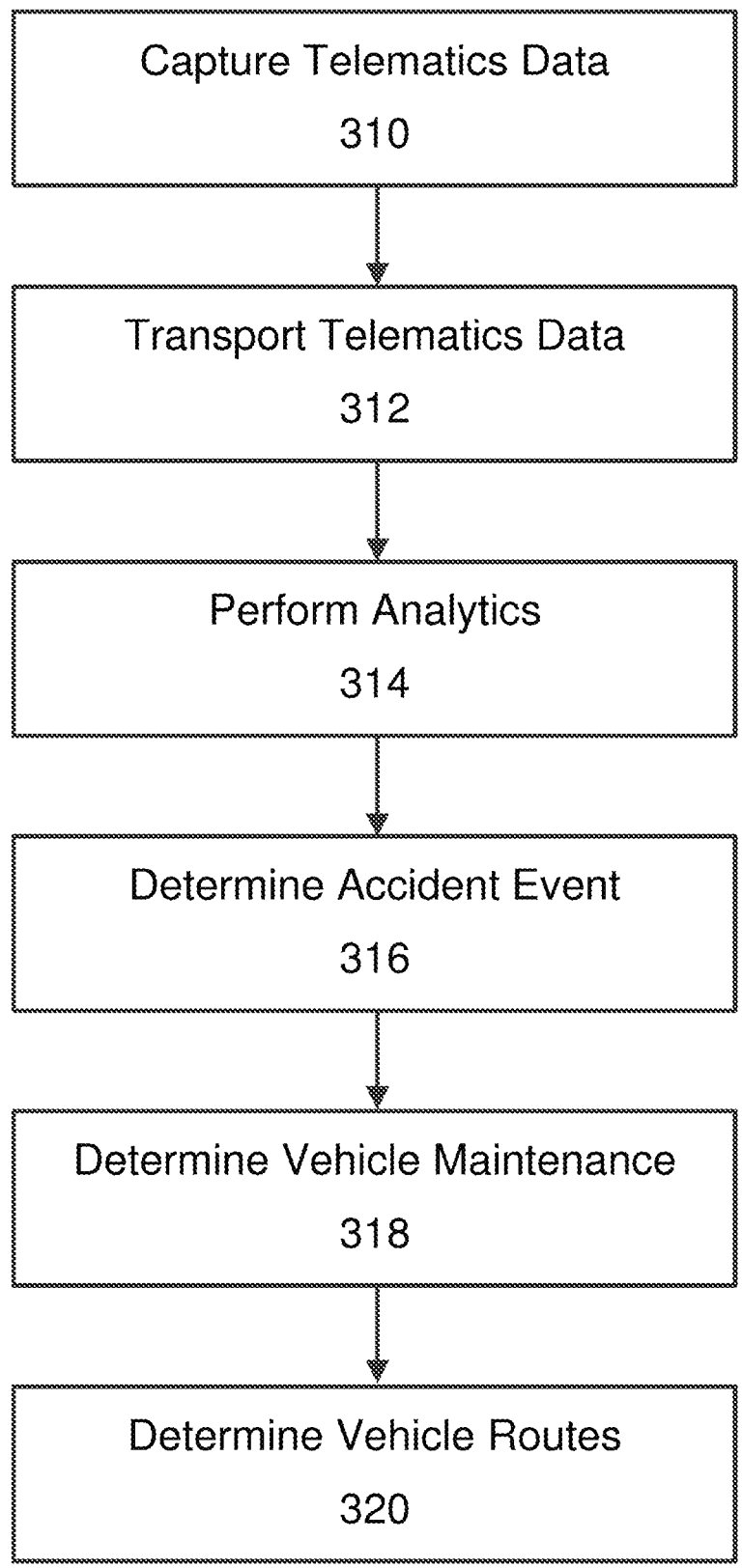
FIG. 3 is a generalized flowchart of the operation of an embodiment of the disclosure.
Figure 4:
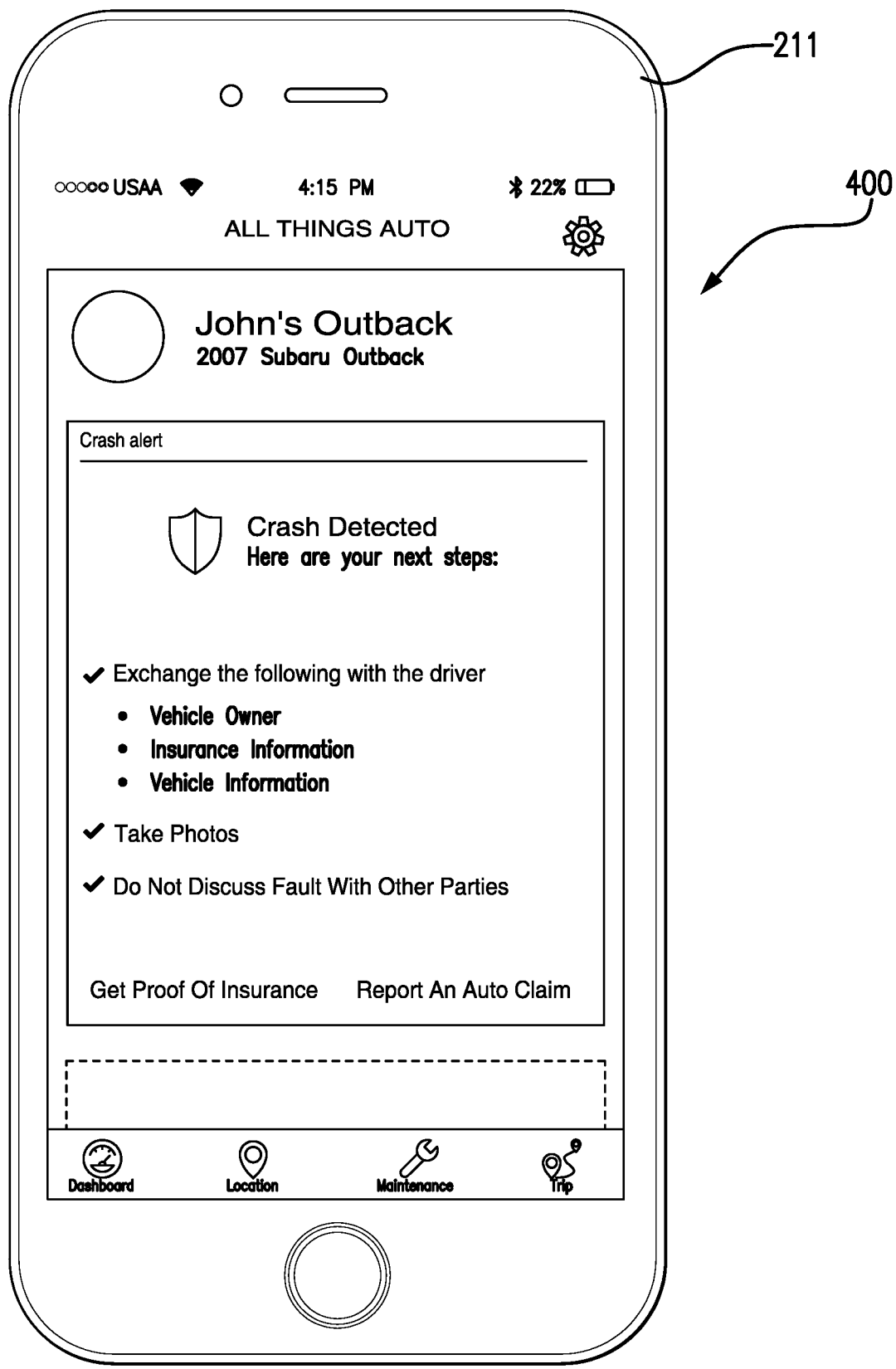
FIGS. 4-6 illustrate exemplary GUI's provided on a user's smart device in accordance with one or more illustrated embodiments.
Figure 5:
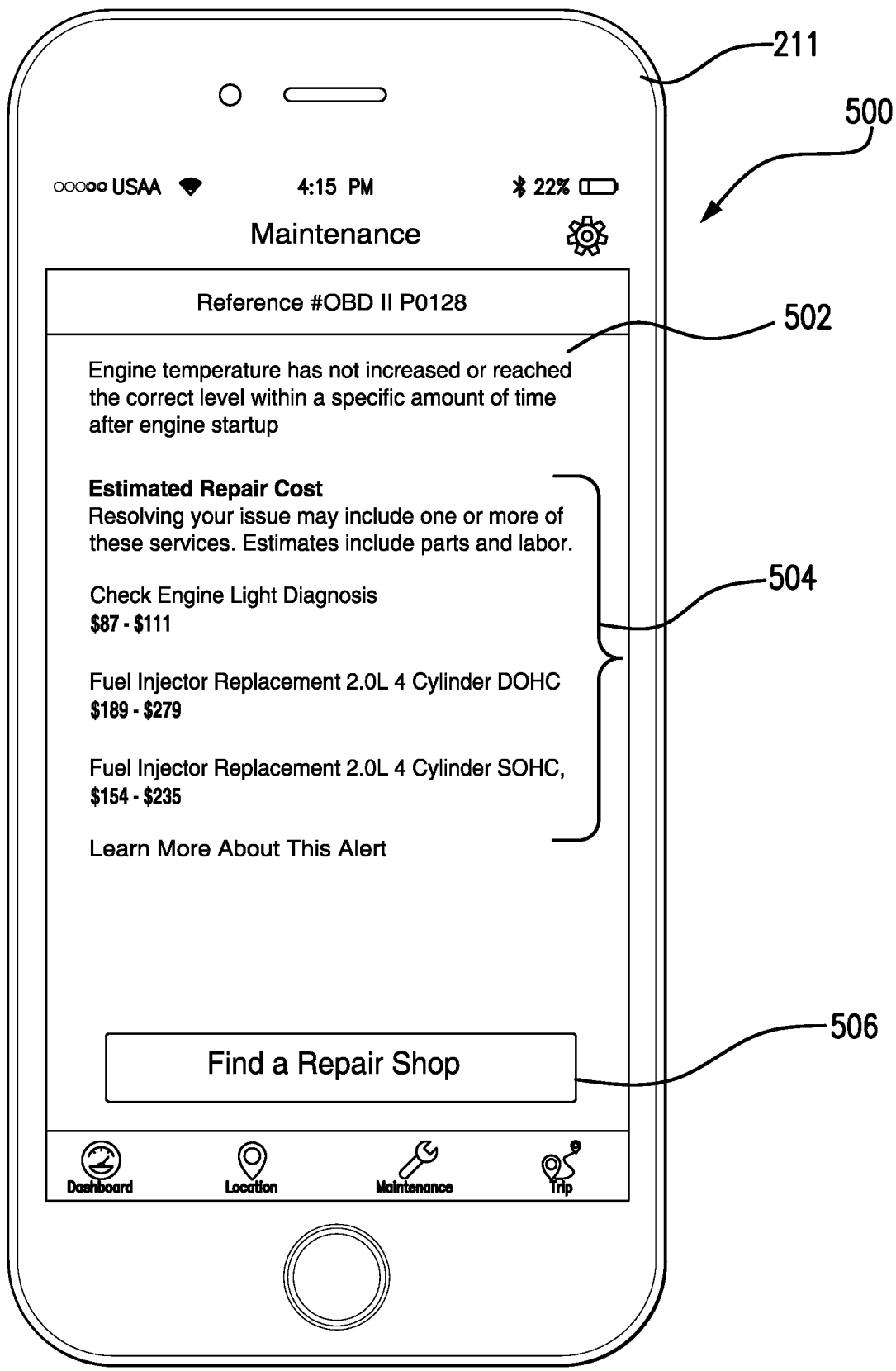
Figure 6:
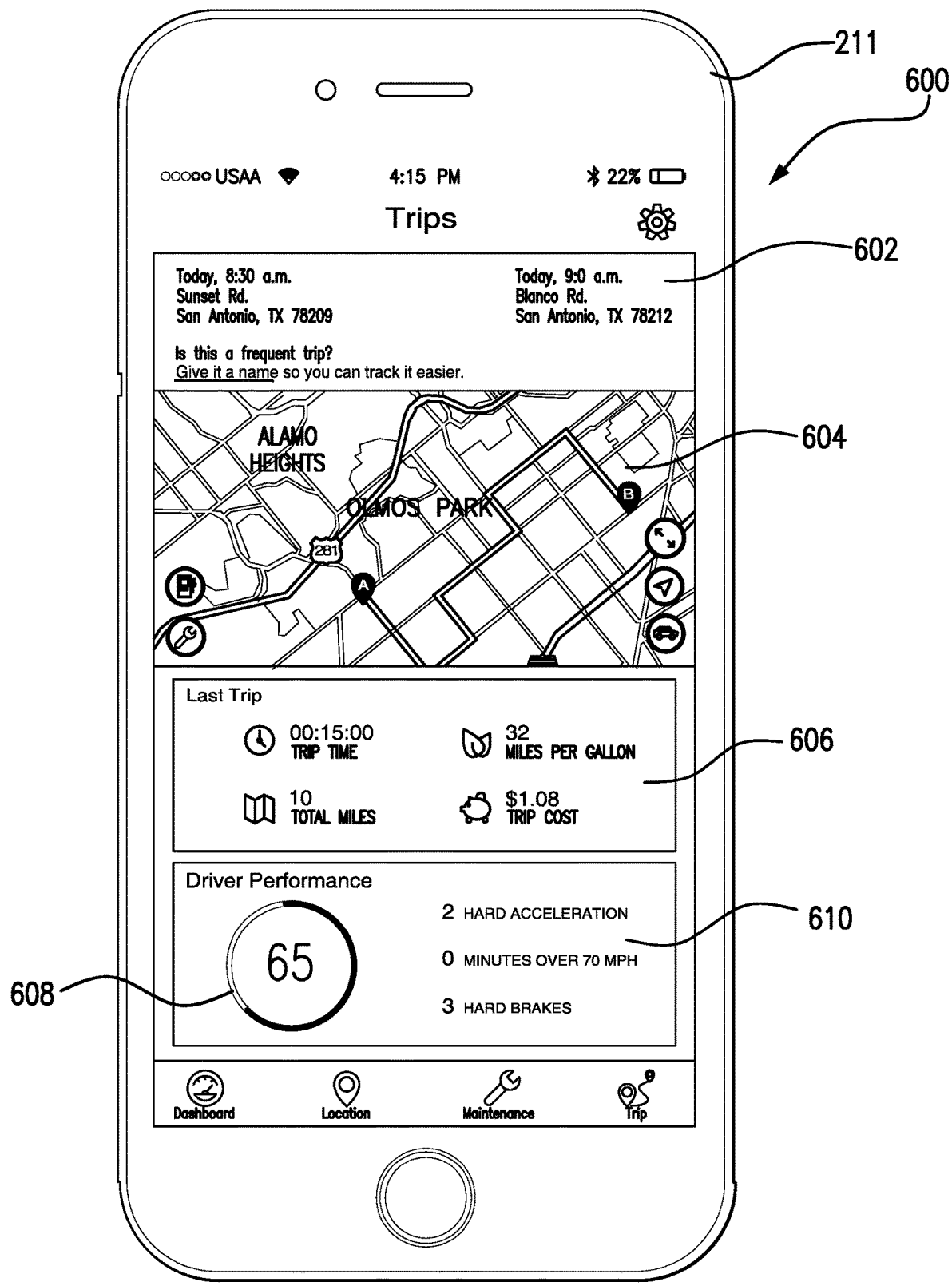

FIG. 3 is a generalized flowchart of the operation of a routing-based insurance system as implemented in accordance with an embodiment of the disclosure. In this embodiment, focus is on a telematics device 204 that captures telematics data from a vehicle 209, which is utilized to determine if the vehicle 209 is engaged in an accident. If it is determined an accident event has occurred, then notification of the accident event is provided to facilitate actions to be taken regarding the accident, including, but not limited to: notifying first responders (e.g., ambulance, police, fire, etc.); providing communication to the operator of the vehicle engaged in the accident; providing notification to a predetermined third person (e.g., the spouse or parent of an occupant in the vehicle) and other actions as mentioned below. It is to be appreciated that in an illustrated embodiment discussed below, on OBD type II device 207 is preferably used to capture telematics data from a vehicle 209 and is sent to a remotely located server 205 preferably via wireless network 220. A transmitter associated with the OBD type II device 207 (which may be either integrated with the OBD type II device 207, or provided separately (e.g., a user's 202 smart phone 205)) preferably transmits the captured telematics data to the computer server 205. However, the illustrated embodiments are not to be limited to the above described embodiment, as the telematics data may be captured from a device other than the OBD type II device 207 (e.g., from a device integrated with the electronics system of the vehicle 209) and the analytics performed on the captured telematics data are not to be understood to be limited to the computer server 205, as they may be performed on another computing device, such as a User's 202 smart phone 211 when configured with appropriate software.

With certain illustrated embodiments described above, discussion will turn to additional illustrated embodiments using telematics which gather and determine information as described herein. With reference now to FIG. 3, illustrated is a flowchart depicting various steps according to one or more illustrated embodiments. Starting at 310, telematics data is captured from a user's vehicle 209 preferably via an ODB type II dongle device 207, preferably the vehicle's 209 diagnostic system. It is to be understood the vehicle 209 may include one or more crash sensors located at different portions of the vehicle (e.g., front, rear, driver and passenger sides, etc.) configured to detect crash impact thereupon. The one or more crash sensors are operatively coupled to the vehicle's diagnostics system. It is to be understood the one or more illustrated embodiments is not to be limited to using the aforementioned crash sensors for detecting accidents as other components and methods may be used, such vehicle acceleration/deceleration (as mentioned below).

Next (step 312), the telematics data captured by the ODB type II dongle device 207 (or at least a portion thereof) is caused to be transmitted preferably to the remotely located computer server 205, preferably via the wireless network 220. In an illustrated embodiment, the ODB type II dongle device 207 includes a transceiver component configured to wirelessly transmit the captured telematics data to the remotely located computer server 205. In other embodiments, a device external (e.g., smart phone 211) to the ODB type II dongle device 207 may be used to wirelessly transmit the captured telematics data to the computer server 205. In yet other illustrated embodiments, the captured telematics data is sent to a computing device that is local to the ODB type II dongle device 207 for performing analytics thereupon, as mentioned below. It is to be appreciated that such a local computing device may include a user's smart phone or tablet device 211.

Once the transmitted captured telematics data is received at the remotely located computer server 205, the computer server 205 is configured to perform analytics thereupon to make one or more of the below determinations as well as provide/cause/instruct one or more of the below actions. With regards to the data analytics, and starting with event determination (step 316), the captured telematics data is analyzed to determine if the vehicle 209 was engaged in an accident (preferably in real time). In one illustrated embodiment, the computer server 205 for determining an accident event is configured to monitor vehicle acceleration in one or more directions and compare the vehicle accelerations to shock thresholds, wherein the shock thresholds correspond to accelerations associated with a destructive force. When at least one vehicle acceleration is determined to exceed one or more shock thresholds, it is then determined the vehicle 209 has been engaged in an accident. In other illustrated embodiments, signals from the one or more crash sensors present in the captured telematics data are indicative during the analytics process that the vehicle has been engaged in an accident. Once it has been determined that the vehicle 209 has been engaged in an accident, the computer server 205 is preferably configured to initiate an insurance claim submission on behalf of the insuree of the vehicle 209, without any user intervention. Preferably, the initiated insurance claim submission includes the details regarding the accident as determined by the captured telematics data (e.g., time, place, vehicle identification, one or more recorded vehicle travel parameters (speed, acceleration, braking, signals used, engine maintenance, etc.)). Thus, the insurance claim process is promptly started and includes precise information regarding the accident to expedite an accurate claim submission process. More specifically, data regarding the accident (e.g., severity, damage type, is vehicle drivable, etc.) and vehicle location information is transmitted from the vehicle 209 to preferably a computer server 205 associated with an insurance policy for the vehicle 209 and/or user involved in the accident. The insurance computer server 205 is then preferably configured to access insurance policy information associated with the vehicle 209 and/or user involved in the accident to initiate/create an insurance claim. In one illustrated embodiment, the operator of the vehicle involved in the accident 209 receives an alert notification preferably on their device 211 to guide them through a claims initiation process (e.g., present questions and options such as: injury type, damage type, provide notifications to other contacts, accident details, etc.). The computer server 205 of the insurance company preferably then utilizes the aforesaid submission information to determine how the insurance claim is to proceed and what options are available (tow, rental car, etc.) (e.g., dependent on the type of coverage available to the insursee). In the event no response is received from the insuree's device 211, the computer server 205 is then preferably configured to cause an agent of the insurance company to directly contact the insuree 202 involved in the accident (e.g., via telephony) to solicit the aforesaid information so as to guide the insursee through the claims initiation process. In one illustrated embodiment, an insuree 202 may be able to store their preferred repair shop in a database associated with the computer server 205, such that in the event of an accident, the damaged vehicle 209 is instructed to be towed to the aforesaid insuree's preferred repair shop. Additionally, when the insursee's 202 damaged vehicle 209 is located outside of a home region, the damaged vehicle 209 is instructed to be towed to a preferred repair shop associated with the insurance company since the distance to the aforesaid insuree's preferred repair shop is not economically feasible.

Furthermore, once it has been determined that the vehicle 209 has been engaged in an accident, the computer server 205 is preferably configured to initiate one or more of the following communications: contact first responders (e.g., ambulance, police and fire) to cause dispatch to the accident scene; provide notification (e.g., via telephony, email, SMS, MSM) of the accident to a contact (e.g., spouse, parent, employer) predetermined by the user 202; contact the user 202 of the vehicle 209 involved in the accident to acquire information from the user (e.g., injuries, accident details) and provide assistance regarding the accident (e.g., if user 202 indicates they are experiencing back pain, inform user 202 to stay in vehicle until a medical first responder arrives). Additionally, and with reference to screen shot 400 of FIG. 4, the computer server 205 upon the determination of an accident event communicates with the user's 202 smart device 211, via wireless network 220, to provide a GUI 400 on the user's smart device 211 providing access to insurance verification; steps to be taken regarding the accident and access to a camera device associated with the user computing device for capturing one or more photographs regarding the accident event, a link to report an auto claim, etc.

In addition to determining an accident event and initiating related actions, as set forth above, the one or more illustrated embodiments may further include the computer server 205 analyzing the captured telematics data to determine maintenance required (step 318) for the vehicle 209. With reference to screen shot 500 of FIG. 5, the computer server 205 provides a GUI 500 on the user's smart device 211 indicating abnormal engine conditions 502, estimated repair costs 504 and the information regarding local repair shops 506 capable of performing the recommended repairs.

The one or more illustrated embodiments may further include the computer server 205 to analyze the captured telematics data to determine route information (step 320) regarding trips for the vehicle 209. With reference to screen shot 600 of FIG. 6, the computer server 205 provides a GUI 600 on the user's smart device 211 indicating route addressing information via a graphical representation of the route 604; route parameters 606 (e.g., Trip Time; Total Miles, Miles Per Gallon and determined Trip Cost); and driver performance score 608 with reference to certain driving behavioral traits (e.g., Hard Acceleration; Mins over 70 MPH and Hard Braking). It is to be appreciated the computer server 205 is configured to utilize this route information to determine the cost for the route travelled as well as recommendation for better routes (e.g., more fuel efficient (a less costly route) and a faster route (e.g., less traffic and/or faster travel speeds)

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanent, removable or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A computer-implemented method for performing analytics on telematics data for providing vehicle event notification, the method comprising:
  capturing telematics data from a data capture device associated with a vehicle;
  transmitting at least a portion of the captured telematics data, via a computer network, to a computer server device remote from the vehicle;
  performing computer analytics upon the received captured telematics data in the computer server device to determine if an accident event has occurred regarding the vehicle by determining if the captured telematics data exceeds a threshold value indicative of a vehicle accident, the performed computer analytics further determines damage type inflicted upon the vehicle;
  initiating, by the computer server, an insurance claim;
  transmitting, by the computer server, to the user device, an accident event notification; and
  displaying, without user intervention, the accident event notification as a Graphical User Interface (GUI) on a user smartphone device associated with the vehicle determined to have an accident occurrence, wherein the GUI includes a plurality of accident related questions seeking user input including 1) injury type; 2) damage type; and 3) contacts to notify.

2. The method as recited in claim 1, wherein the data capture device is an OBD type II dongle device.

3. The method as recited in claim 1, wherein the computer server device is a remotely located server.

4. The method as recited in claim 1, further including the computer server device monitoring vehicle acceleration in one or more directions and compare the vehicle accelerations to shock thresholds, wherein the shock thresholds correspond to accelerations associated with a destructive force.

5. The method as recited in claim 1, further including the computer server device identifying at least one vehicle acceleration that exceeds one or more shock thresholds.

6. The method as recited in claim 1, further including the computer server device causing a telephone call to be initiated on the user smartphone device in the event the user does not interact with the GUI caused to be displayed on the user smartphone device within a predetermined time period.

7. The method as recited in claim 1, further including the computer server device upon determination of an accident event providing notification of the accident event to a first responder.

8. The method as recited in claim 1, further including the computer server device upon determination of an accident event providing notification of the accident event to a predetermined contact.

9. The method as recited in claim 1, further including
the computer server device upon determination of an accident event initiating a telephonic communication between a third party and the user smart phone device for providing assistance regarding the accident event.

10. The method as recited in claim 1, further including the computer server device upon determination of an accident event providing notification of the accident event to a tow vehicle service for causing dispatch of a tow vehicle to the vehicle involved in the accident event.

11. The method as recited in claim 1, further including the computer server device upon determination of an accident event providing notification of the accident event to a rental car service for causing a rental vehicle availability for the user of the vehicle involved in the accident and wherein the GUI provides access to a camera device associated with the user smartphone device for capturing one or more photographs regarding the accident event.

12. The method as recited in claim 1, further including: displaying, by the GUI, data relating to the accident event wherein the GUI is configured to enable a user to input data via the GUI for the insurance claim, wherein the data relating to the determined accident event as displayed on the GUI includes:
time of accident; place of accident; vehicle identification and one or more travel parameters associated with the vehicle at the time of the determined accident including at least one of:
vehicle speed; acceleration; braking; signals used and engine maintenance information.

13. A computer system for performing analytics on telematics data for providing accident event notification, comprising:
a data capture device associated with a vehicle for capturing telematics data associated with a vehicle;
a computer server device communicatively coupled to the data capture device configured to receive captured telematics data from the data capture device, via a computer network, the computer server device is configured to:
determine if an accident event has occurred regarding the vehicle based upon the computer analytics performed upon the captured telematics data, the performed computer analytics further determines damage type inflicted upon the vehicle; and
initiate an insurance claim;
transmit, without user intervention, an accident event notification on a user smartphone device associated with the vehicle determined to have an accident event; and
display, on the user smartphone device, the accident event notification as a Graphic User Interface (GUI), wherein the GUI includes a plurality of user input accident related questions including 1) injury type; 2) damage type; and 3) contacts to notify.

14. The system as recited in claim 13, wherein the computer server device, upon determination of an accident event, is further configured to provide notification of the accident event to a first responder.

15. The system as recited in claim 13, wherein the computer server device, upon determination of an accident event, is further configured to provide notification of the accident event to a predetermined contact.

\* \* \* \* \*